United States Patent [19]
Fukushima et al.

[11] Patent Number: 4,481,254
[45] Date of Patent: Nov. 6, 1984

[54] AGRICULTURAL PLASTIC FILM

[75] Inventors: Nobuo Fukushima, Ootsu; Kiyohiko Nakae, Nishinomiya; Takayuki Terazawa, Shiga, all of Japan

[73] Assignee: Sumitomo Chemical Company, Ltd., Osaka, Japan

[21] Appl. No.: 391,976

[22] Filed: Jun. 24, 1982

Related U.S. Application Data

[62] Division of Ser. No. 148,230, May 9, 1980.

[30] Foreign Application Priority Data

May 15, 1979 [JP] Japan .................................. 54-60025
May 15, 1979 [JP] Japan .................................. 54-60024
May 15, 1979 [JP] Japan .................................. 54-60026
Nov. 15, 1979 [JP] Japan ................................ 54-148632

[51] Int. Cl.³ .......................... B32B 9/04; A01G 7/00
[52] U.S. Cl. .................... 428/329; 428/330; 428/331; 428/332; 428/448; 428/451; 428/516; 428/520; 47/9
[58] Field of Search ............... 428/516, 448, 451, 331, 428/330, 332, 329

[56] References Cited

U.S. PATENT DOCUMENTS

| | | | |
|---|---|---|---|
| 3,788,923 | 1/1974 | Soliman | 428/451 |
| 4,075,784 | 2/1978 | Pied | 47/9 |
| 4,252,851 | 2/1981 | Lansbury et al. | 428/516 |
| 4,264,659 | 4/1981 | Pattenden | 428/516 |
| 4,291,082 | 9/1981 | Stall | 428/516 |

Primary Examiner—Patricia C. Ives
Attorney, Agent, or Firm—Armstrong, Nikaido, Marmelstein & Kubovcik

[57] ABSTRACT

An agricultural plastic film improved in retention of infrared radiation which comprises an olefin resin film produced by forming a composition comprising 100 parts by weight of an olefin resin (A) and 2 to 25 parts by weight of a compound oxide (B) comprising $SiO_2$ and at least one member of the oxides of metals selected from Groups II, III and IV of the periodic table, the ratio of the refractive index ($n_A$) of said olefin resin to that ($n_B$) of said compound oxide, $n_A/n_B$, being within a range of 0.99 to 1.02, into film.

7 Claims, No Drawings

AGRICULTURAL PLASTIC FILM

This is a division of application Ser. No. 148,230 filed May 9, 1980.

The present invention relates to agricultural plastic film, made from olefin resins improved in retention of infrared radiation, further transparency and rubbing resistance. More particularly, it relates to agricultural plastic film substantially transmitting visible ray but not infrared ray which comprises an olefin resin film produced by forming a composition comprising 100 parts by weight of an olefin resin (A) and 2 to 25 parts by weight of a compound oxide (B) comprising $SiO_2$ and at least one member of the oxide of metals selected from Groups II, III and IV of the periodic table, the ratio of the refractive index ($n_A$) of said olefin resin to that ($n_B$) of said compound oxide, $n_A/n_B$, being within a range of 0.99 to 1.02, into film.

As conventional covering materials for greenhouses or tunnels used for greenhouse culture, polyvinyl chloride films and polyolefin resin films such as polyethylene film and ethylene/vinyl acetate copolymer film have principally been used. Of these films, polyvinyl chloride film has widely been used until recently because it is excellent in retention of infrared radiation, transparency, toughness and durability. While this film is used, however, its surface becomes sticky as a plasticizer in it bleeds to the surface. As a result, dusts adhere to the surface to lower the transmission of light so largely that a rise in greenhouse temperature is hindered. Consequently, the growth of crops is undesirably affected. Besides, the treatment of the film as waste after use is difficult since the film generates hydrogen chloride gas on incineration.

Further, polyvinyl chloride film loses flexibility at low temperatures to become poor in impact resistance, so that it does not withstand uses in cold districts.

While, since olefin resin film contains no plasticizer and has a stable chemical structure, it shows little change in the transmitting of light over a long period of time, and besides it generates no injurious gas on incineration. Olefin resin film is superior to polyvinyl chloride film in these points, but it is inferior thereto in the retention of infrared radiation. This is the reason why olefin resin film has not been used popularly as a covering film for greenhouses although it keeps a property to transmit light for a long time.

Recently, ethylene/vinyl acetate copolymer film, one of the olefin resin films, attracts attention as a covering material for agriculture, as a result of the appreciation of its transparency, flexibility and cold resistance. It is however inferior to polyvinyl chloride film in the retention of infrared radiation as described above and rubbing resistance. Concretely speaking, it breaks down by rubbing against the piping portions and fixing bands of pipe-assembled greenhouses when closed and opened repeatedly for ventilation or flapped by wind.

Generally, the retention of infrared radiation of covering films for greenhouses refers to a property to prevent a greenhouse temperature at night from lowering. In the daytime, soil in greenhouses absorbs heat from sun light and radiates the heat as radiation at night to keep the greenhouse temperature higher than the open air. When the covering film transmits the radiation from soil surface to a large extent, the radiation runs off the greenhouse to lower the soil temperature, and as a result it becomes impossible to keep the greenhouse temperature higher than the open air. Consequently, the retention of infrared radiation of the covering film depends upon the degree to which the film absorbs or reflects the radiation, and it results that the higher the degree the superior the retention of infrared radiation.

Further, covering films for greenhouse are required to have a property to prevent the deposit of water droplets. This property refers to a property to prevent the deposit of water droplets to the inside surface of the film which are formed by the condensation of water vapor in greenhouses. Since olefin resin films are poor in wettability with water, it has been indicated that the films are inferior in the property. For this reason, the wettability of the films is improved by incorporating a wetting agent (anti-fogging agent), etc., but the retention of the property is insufficient and the agent markedly bleeds to the film surface to lower the light transmission of the film. Consequently, films having a good property to prevent the deposit of water droplets are not yet obtained.

As covering films of olefin resin improved in the retention of infrared radiation, there are known those comprising incorporating an inorganic filler (e.g. silicon oxide, dehydrated kaolinite) in an olefin resin. This improved retention of infrared radiation of olefin resin films is however still insufficient as compared with polyvinyl chloride film, and the most serious problem on the films is that the incorporation of the inorganic filler makes the transparency, particularly transmissivity to parallel light of the films poorer than that of polyvinyl chloride film and ethylene/vinyl acetate copolymer film. The reason for this may be considered as follows: There is a great difference in refractive index between the foregoing filler and olefin resin, so that light scattering is caused at the resin/filler interface to lower the transmittivity to parallel light, and besides, in producing the olefin resin films by the common methods (e.g. T-die cast technique, inflation technique), the film surface is easy to become uneven by the added inorganic filler when the molten resin extruded from a die is cooled and solidified while being drawn down.

It is generally said that covering films for agriculture should transmit more than 80–85% of incident sunlight, that is, they should have a total transmittance of more than 80–85%. Even though the total transmittance is satisfied, however, the growth of crops is largely affected by which of parallel light or scattered light the films transmit better. For example, the followings are becoming gradually clear in recent years: Parallel light is generally favorable for the growth of the common vegetable fruits including summer crops (e.g. tomato, cucumber, watermelon); while scattered light often causes problems in the coloring and growth of the fruits, but it is rather favorable for the growth of seedlings of edible herbs (e.g. lettuce, cabbage) and paddy rice plants since it promotes the growth of the leaves. But farmers still often use transparent polyvinyl chloride film which provides good transmission of parallel light for the culture of not only vegetable fruits but also edible herbs except paddy rice plants. This is also due to a great advantage that the growth of crops in greenhouses can clearly be seen from the outside.

For the reasons as decribed above, the fact of the matter is that the foregoing technique for improving the retention of infrared radiation of polyolefin films which comprises incorporating particular inorganic fillers in polyolefins has not yet generally been used although the technique was early proposed.

In order to solve this problem, attempts were recently made to elevate the transmissivity to parallel light and improve the retention of infrared radiation by incorporating particular high molecular weight compounds such as polyacetal in polyolefins. But the improvement of the retention of infrared radiation is still insufficient.

The inventors extensively studied to provide olefin resin films for agriculture at a low cost which are free from the drawbacks of the conventional olefin resin films as agricultural plastic film and are superior in retention of infrared radiation, transmissivity to parallel light, prevention of water droplet deposit and rubbing resistance. As a result, it was found that an olefin resin film produced by forming a composition comprising an olefin resin and a compound oxide powder having a refractive index almost equal to that of the olefin resin, into film. The inventors thus attained to the present invention.

The first feature of the present invention is that a transparent olefin resin film superior in the transmissivity to parallel light is obtained, although the olefin resin contains an inorganic filler, by making the refractive index of the filler equal to that of the olefin resin thereby preventing the scattering of light at the resin/filler interface to outstandingly decrease internal haze, and besides, the poorness of the retention of infrared radiation, which is a drawback of the conventional polyolefin films, is largely improved to such a degree as to be comparable to the retention of infrared radiation of polyvinyl chloride film.

The second feature of the present invention is that olefin resin films largely improved in performances can be provided at cost not much different from that of the conventional olefin resin films for agriculture for the following reasons: The compound oxide having a required refractive index is available at a low cost since it can be produced by conventional methods; it can be incorporated in olefin resins together with other additives on producing the conventional agricultural plastic films, so that the conventional techniques can be applied as they are; and besides film formation is easy.

The third feature of the present invention is that the treatment as waste of the present compositions mainly comprising olefin resins after use is very easy since the present compositions are substantially easy to incinerate and generate no injurious gas such as hydrogen chloride gas on incineration.

The foregoing features are the advantages of the present invention over the conventional techniques.

The present invention will be illustrated in detail.

As the olefin resin (A) used in the present invention, there may be given for example homopolymers of α-olefin and copolymers of α-olefin (mainly component) and other monomers such as polyethylene, polypropylene, ethylene/propylene copolymers, ethylene/butene copolymers, ethylene/4-methyl-1-pentene copolymers, ethylene/vinyl acetate copolymers and ethylene/acrylic acid copolymers. Of these polymers, those which are desirable as agricultural plastic film in terms of transparency, weather resistance and cost are polyethylene or ethylene/α-olefin copolymers having a density (20° C.) of 0.910 to 0.935 g/cm³, preferably 0.918 to 0.928 g/cm³, and ethylene/vinyl acetate copolymers having a density (20° C.) of 0.918 to 0.962 g/cm³, preferably 0.920 to 0.950 g/cm³ and containing not more than 30% by weight of vinyl acetate. Of these ethylene/vinyl acetate copolymers, those containing 5 to 25% by weight of vinyl acetate are particularly desirable in terms of transparency, flexibility and weather resistance.

Manufacturing methods for the foregoing polyethylene and ethylene/α-olefin copolymers are not particularly limited, and the polymers produced by any of the conventional high, medium and low pressure processes can be used in the present invention. The melt index of these olefin resins is not particularly limited, so far as it is within a range commonly used in film processing. Particularly, it is recommended that the melt index is 0.1 to 10 g/10 min., preferably 0.5 to 7 g/10 min. as measured according to ASTM D 1238-73 E.

The compound oxide used in the present invention comprising $SiO_2$ and at least one member selected from the oxides of metals belonging to Groups II, III and IV of the periodic table, is represented by the formula, $$(SiO_2)_x \cdot (M_\alpha O_\beta)_y \cdot nH_2O$$

or $$(SiO_2)_x \cdot (M_\alpha O_\beta)_y \cdot (R_\gamma O_{67})_z \cdot nH_2O$$

wherein M and R are each a metal belonging to Groups II, III or IV of the periodic table, α and γ are each 1 or 2, β and δ are each an integer of 1 to 3, n is zero or a positive number, and x, y and z are positive numbers which are determined so that the refractive index of said compound oxide may be as close to that of the olefin resins as possible according to the gist of the present invention. Within the scope and spirit of the present invention, the compound oxide may have the formula, $$(SiO_2)_x \cdot (M_\alpha{}^1 O_\beta)_{y1} \cdot (M_\alpha{}^2 O_\beta)_{y2} - (M_\alpha{}^m O_\beta)_{ym} \cdot nH_2O$$

or it may contain a small amount of impurities such as other metallic oxides.

Examples of the foregoing metallic element include for example B, Be, Mg, Ca, Ba, Al, Zn, Ti, Zr, Pb and Sn. Of these elements, Al, Ti, Mg and Ca are particularly preferred in terms of the easy control of refractive index and cost.

Generally, the refractive index of the olefin resins used in the present invention is within a range of 1.48 to 1.52. As examples of the compound oxide giving a refractive index as close to the above one as possible, the following aluminum silicate may for example be given:

$$(SiO_2)_x \cdot (Al_2O_3)_y \cdot nH_2O$$

wherein x and y are positive numbers satisfying $$0.05 \leq y/x \leq 1, \text{ preferably } 0.1 \leq y/x \leq 0.43.$$

and n is zero or a positive number, preferably a positive number, more preferably a positive number of less than 40 when y is 1.

As examples of titanium silicate among said compound oxide, the following compound may be given:

$$(SiO_2)_x \cdot (TiO_2)_y \cdot nH_2O$$

wherein x and y are positive numbers satisfying $$0.01 \leq y/x \leq 0.34, \text{ preferably } 0.05 \leq y/x \leq 0.18,$$

and n is zero or a positive number, preferably a positive number, more preferably a positive number of less than 150 when y is 1.

As examples of magnesium silicate among said compound oxide, the following compound may be given:

wherein x and y are positive numbers satisfying $0.075 \leq y/x \leq 0.5$, preferably $0.1 \leq y/x \leq 0.33$, and n is zero or a positive numbers, preferably a positive number, more preferably a positive number of less than 30 when y is 1.

As examples of calcium silicate among said compound oxide, the following compound may be given:

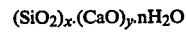

wherein x and y are positive numbers satisying $0.05 = y/x = 0.35$, preferably $0.08 = y/x = 0.21$, and n is zero or a positive number, preferably a positive number, more preferably a positive number of less than 40 when y is 1.

Of these compound oxides, amorphous ones are more suitable for use in the present invention in terms of transparency than crystalline ones.

Specifically, the refractive index ($n_A$) of the olefin resin used in the present invention is measured using a D-line of sodium lamp at 25° C. and at a relative humidity of 65%, and then the refractive index ($n_B$) of the compound oxide is determined so that it may satisfy $0.99 \leq n_A/n_B \leq 1.02$, preferably $0.995 \leq n_A/n_B \leq 1.01$. When the value of $n_A/n_B$ is outside the above range, the ransmittance of parallel light passing through the resulting film lowers.

As to the compound oxide, anhydrides are more desirable than hydrated gels in terms of processability, but the latter is more desirable in terms of the improvement of retention of infrared radiation which is an object of the present invention. Particularly, hydrated gels with adsorbed water in large amounts are more desirable. For example, hydrated gels containing not less than 10% by weight, preferably not less than 20% by weight, of adsorbed water at 25° C. and at a relative humidity of 65% are desirable. The possible reason for the elevation of the retention of infrared radiation is that the transmissivity to infrared ray of the compound oxide itself is synergistically elevated by that of water. Further, an effect to prevent the deposit of water droplets develops on the film in which a said hydrated gel of a water adsorbing ability is incorporated. Consequently, the use of wetting agents commonly incorporated in agricultural plastic films is effective to keep the effect since these agents are gradually released.

Generally, the hydrated gels are more desirable than the anhydrides for the reasons as described above, but the anhydrides may be used considering the required degree of improvement in the retention of infrared radiation.

From the points described above, amorphous aluminum silicate gel having the following property and composition is particularly desirable in the present invention: the molar ratio of $Al_2O_3$ to $SiO_2$, ($Al_2O_3/SiO_2$), 0.08–0.33, preferably 0.15–0.25; the content of adsorbed water at 25° C. and at 65% RH, not less than 10% by weight, preferably not less than 20% by weight.

In the use of the compound oxide, the oxide needs to be finely pulverized, for example, to an average particle size of not more than $20\mu$, preferably not more than $10\mu$. When the olefin resin film containing the compound oxide is used alone, the average particle size of the oxide should be not more than $10\mu$, preferably not more than $5\mu$, and particularly preferred oxides are such that the average particle size is not more than $3\mu$ and besides coarse particles of not less than $10\mu$ are not contained. When the average particle size is beyond the above range, the produced film becomes poor in appearance and transmittivity to parallel light because of the formation of surface unevenness, and also the film characteristics lower.

The blending ratio of the compound oxide to the olefin resin varies with the embodiment of the present invention and a required degree of the retention of infrared radiation. Generally, however, the amount of the oxide is 2 to 25 parts by weight, preferably 3 to 15 parts by weight, particularly preferably 3 to 10 parts by weight, based on 100 parts of the olefin resin. When the amount is less than 2 parts by weight, effects of improving the retention of infrared radiation and the prevention of water droplet adhesion are not much observed. When the amount exceeds 25 parts by weight, the strength of the produced film lowers. For example, when the olefin resin film of the present invention is used alone, the addition of 3 to 10 parts by weight of the compound oxide is sufficient to improve the retention of infrared radiation. While, when the olefin resin film is used as a laminated film having a resin film on each side of it, the amount needs to be properly determined within the above range depending upon the composition of lamination and required performances.

In carrying out the method of the present invention, the olefin resin and compound oxide powder are blended or kneaded by the common methods using roll mixers, Banbury mixer or extruders, followed by pelletizing. Film processing is generally carried out at 130° C. to 250° C. When the hydrated compound oxide adsorbs water, the hydrated compound oxide should be dried prior to processing.

When the compound oxide-containing olefin resin film of the present invention is used alone, said pellets are formed into film by the common processing methods such as tubular processing, calendering and T-die processing. In forming the olefin resin into film, the addition of a dispersing agent to the resin is also effective to elevate the dispersion of the compound oxide. The agent includes for example sorbitan fatty acid esters (e.g. sorbitan monostearate) and glycerin fatty acid esters (e.g. glycerin monostearate). The amount of the agent is 0.2 to 2 parts by weight per 100 parts by weight of the olefin resin (A). Further, it is also effective to add suitable stabilizers, ultraviolet absorbers, antistatic agents and if necessary wetting agents.

Further, in the present invention, said film of olefin resin (A) incorporated with the compound oxide may be laminated with a film of a laminating resin selected from ionomer resins (C) and olefin resins (D) on one or both sides, preferably both sides, thereof.

In this case, surface unevenness formed on film-forming is improved by laminating a resin film containing no filler on one or both surfaces (sides) of said film of olefin resin (A). As a result, external haze is decreased to obtain a transparent film much superior in transmittivity to parallel light. Further, by laminating a resin film of superior rubbing resistance containing no filler on one or both sides of the film of olefin resin (A), the rubbing resistance of the laminated surface is remarkably elevated and the toughness of the film can be elevated to such a degree as to be comparable to that of polyvinyl chloride film.

The ionomer resins (C) for laminating the film of olefin resin (A) include α-olefin/α,β-unsaturated carboxylic acid copolymers having a metallic ion-cross-linked structure. A commercially available resin, Surlyn (produced by DuPont Co.), is a resin of this type in which: α-olefin is ethylene: α,β-unsaturated carboxylic acid is methacrylic acid; the content of the acid is 1 to 5 mole %; and the metallic ion is $Na^+$ or $Zn^{++}$. The ionomer resins preferably used in the present invention are $Na^+$ or $Zn^{++}$ type ones having a density of 0.935 to 0.975 g/cm$^3$ and a melt index of 0.5 to 7 g/10 min.

The olefin resin (D) laminated on the film of the olefin resin (A) can be selected from olefin resins used as to the resin (A), but those having a good rubbing resistance are particularly preferred. According to the inventors' information, covering materials (e.g. film) for greenhouses deteriorate into breakdown by rubbing against the frame (e.g. iron pipe, bamboo) of greenhouses and bands for fixing the materials on the frame, when closed and opened repeatedly for ventilation or vibrated by wind, as well as by heat generated by rubbing and heat given by sun light.

Consequently, as olefin resins (D) laminated on the film of resin (A), those having good thermal resistance and wear resistance and generating little heat by rubbing are preferred. For example, polyethylene or ethylene/α-olefin copolymers having a density of 0.910 to 0.935 g/cm$^3$, preferably 0.918 to 0.933 g/cm$^3$ and a melt index of 0.1 to 4 g/10 min., preferably 0.4 to 2 g/10 min., are preferred.

Manufacturing methods from these polyethylenes are not particularly limited, but ethylene/α-olefin copolymers produced by conventional medium or low pressure process are more desirable in terms of thermal resistance and durability than polyethylenes produced by the high pressure process. Particularly, ethylene/butene copolymers, ethylene/pentene copolymers, ethylene/hexene copolymers, ethylene/methyl-1-pentene copolymers and ethylene/octene copolymers produced by the medium to low pressure process using a transition metal catalyst are desirable.

Further, as to the ethylene/vinyl acetate copolymers, their vinyl acetate content is not more than 20% by weight, preferably not more than 10% by weight, and their melt index is 0.1 to 3 g/10 min., preferably 0.1 to 3 g/10 min., preferably 0.1 to 1.5 g/10 min.

As to the ethylene/acrylic acid copolymers, the acrylic acid content of the copolymers is not more than 30% by weight, preferably not more than 25% by weight.

In order to apply the film of a laminating resin selected from the ionomer resins (C) and olefin resins (D) to the film of the olefin resin (A) containing the compound oxide, the conventional laminating techniques may be applied. For example, the films are separately formed and laminated by the dry-laminating or heat-laminating technique; the laminating resin is applied to the film of the resin (A) containing the compound oxide by the extrusion laminating technique; and the resin (A) and the laminating resin are formed into laminated film by the multi-laminated film extrusion technique. Of these techniques, the last one is preferred in terms of the ease of molding and the interlaminar adhesive strength, transparency and cost of the resulting film. Further, as film of broad width is desired for agricultural purposes, the multi-laminated film extrusion technique is desirable. When the laminated film has three layers, the resins of both outer layers of the laminated film may be different from each other, but the same kind of resin is sufficient for general purposes considering the cost of extruders.

The thickness of the film of the olefin resin (A) containing the compound oxide and that of the layer of resin (C) or (D) are determined according to the final uses and objects. Generally, however, the thickness of the resin (A) film is about 30μ to about 200μ, although it varies with a required degree of the retention of infrared radiation and the blending ratio of the compound oxide to the olefin resin (A). While, as to the thickness of the layer of resin (C) or (D), a thickness ensuring the decrease of the external haze of the resin (A) film and the development of rubbing resistance, generally about 10μ to about 20μ, is sufficient.

As to the layer of resin (C) or (D) of the laminated film thus obtained, it is also effective, like the resin (A) film, to incorporate suitable stabilizers, ultraviolet absorbers, antistatic agents and if necessary water droplet adhesion preventing agents in the layers.

In using the olefin resin film of the present invention as covering film for greenhouses, the following advantages can be obtained: The retention of infrared radiation of the film is greatly improved to such a degree as to be comparable to that of polyvinyl chloride film; the olefin resin film has the same transmissivity to parallel light as that of polyvinyl chloride film, and besides the transmissivity shows rather less change with the lapse of time than that of polyvinyl chloride film; the transmissivity to parallel light of the olefin resin film is remarkably superior to that of conventional olefin resin films in which inorganic fillers are incorporated to improve the retention of infrared radiation; and the rubbing resistance and toughness of the olefin resin film are very good and equal to those polyvinyl chloride film. Consequently, the olefin resin film of the present invention is very useful as agricultural plastic film.

The present invention will be illustrated with reference to the following examples, but the present invention is not limited thereto.

The retention of infrared radiation in the examples and comparative examples was measured as follows: A test box (about 30 cm. cube) was used of which one face was made of a test film and other faces a heat-insulating material with aluminum plate on the inside surface; a heated block of 100° C. was placed in the box, and temperature change in the box was measured by means of a thermistor; the same measurement was made using a test box having a glass plate (about 2 mm. thick) in place of the test film; a temperature difference (ΔT°C.) obtained by subtracting the latter value from the former one was taken as the retention of infrared radiation.

Transparency was expressed with haze value and total transmittance as scale which were measured using a haze meter according to JIX K 6714. Transmittance of parallel light was obtained by the following equation:

Transmittance of parallel right=total transmittance−haze value

The refractive index of the inorganic powder was measured by the dipping method, and that of the polymer film was measured by Abbe's refractometer. The measurement was carried out using D line of sodium lamp in a room kept at 25° C. and at 65% RH.

Rubbing resistance was measured as follows: A test film of known weight was fixed by sticking to the circular section of a cylinder (200 $\phi$ mm.) so that wrinkles may not be formed; an iron ring-form rotor (100 $\phi$ mm.) was vertically pressed, with its surface well polished with #180 sand paper turned down to the fixed film, against the film to 20 mm. below the original film level; water (20 c.c.) was poured onto the surface of the film in order to avoid an extreme rise in temperature by rubbing; the rotor was rotated at 240 rmp until the film was broken; and a time required for film breakdown and a decrement in film weight per hour were measured.

The prevention of water droplet deposit was tested as follows: Water (30° C.) was placed in a 100-c.c. beaker which was then covered with a test film, dipped in a constant-temperature vessel (30° C.), and placed in a sunny place. A state after a required period of time was observed. The results were expressed based on the following standard:
  o No water droplets attached.
  Δ A group of water droplets was observed locally.
  x Water dropless attached all over the whole.

A synthetic method for the compound oxide according to the present invention is not particularly limited, so far as the property of the oxide is within the scope of the present invention. Aluminum silicate gel used in the present invention can also be synthesized by the following method: To distilled water (170 kg) in a stainless steel reactor were added dropwise a solution of sodium hydroxide (28 kg) in water glass (150 kg; grade, JIS No. 3) and a 8% aluminum sulfate solution (200 kg) at the same time at a rate of 1.3 to 1.5 kg/min. with stirring while keeping the temperature at 30° C. The pH of solution was kept between 5 and 6. After the addition was finished, the reaction solution was stirred for 1 hour under the same condition to complete the reaction. The resulting slurry was separated into solid and liquid portions by a centrifugal filter, and the solid portion was repeatedly washed with distilled water to remove water-soluble matters. The final wet cake was dried at 120° C. for 24 hours to obtain aluminum silicate gel of the formula, $Al_2O_3 \cdot (SiO_2)_{4.5} \cdot nH_2O$. The refractive index of the gel was 1.493. An adsorbed water content at 25° C. and at 65% RH was 21%.

EXAMPLE 1

One hundred parts by weight of an ethylene/vinyl acetate copolymer [melt index, 2 g/10 min.; refractive index ($n_A$), 1.498] containing 15% by weight of vinyl acetate, 5 parts by weight of aluminum silicate gel [refractive index ($n_B$), 1.493; content of adsorbed water at 25° C. and at 65% RH, 21%; average particle size, 4μ] previously dried at 150° C. for 2 hours comprising 26% by weight of $Al_2O_3$, 67% by weight of $SiO_2$ and 7% by weight of ignition loss, and 0.3 part by weight of a dispersing agent (glycerin monostearate) were kneaded at 150° C. for 8 minutes by Brabender Plastograph, and then formed into a film of 100μ thick by pressing at 170° C. As shown in Table 1, the resulting film was transparent and superior in the retention of infrared radiation and the prevention of water droplet adhesion.

EXAMPLE 2

Operation was carried out in the same manner as in Example 1 except that an ethylene/vinyl acetate copolymer [melt index, 2 g/10 min.; refractive index ($n_A$), 1.489] containing 25% by weight of vinyl acetate was used in place of the ethylene/vinyl acetate copolymer containing 15% by weight of vinyl acetate. Thus, a film of 100μ thick was obtained. The properties of the film were measured in the same manner. The results are shown in Table 1.

EXAMPLE 3

Operation was carried out in the same manner as in Example 1 except that a low-density polyethylene [melt index, 1.8 g/10 min.; refractive index ($n_A$), 1.515] having a density of 0.924 was used in place of the ethylene/vinyl acetate copolymer. The properties of a film thus obtained were measured in the same manner. The results are shown in Table 1.

EXAMPLE 4

Operation was carried out in the same manner as in Example 1 except that the amount of aluminum silicate gel was changed to 15 parts by weight. The properties of a film thus obtained were measured in the same manner. The results are shown in Table 1.

EXAMPLE 5

One hundred parts by weight of an ethylene/vinyl acetate copolymer [refractive index ($n_A$), 1.498] containing 15% by weight of vinyl acetate, 5 parts by weight of aluminum silicate [refractive index ($n_B$), 1.494; content of adsorbed water at 25° C. and 65% RH, 3%; average particle size, 3μ] comprising 72% by weight of $SiO_2$, 27.5% by weight of $Al_2O_3$ and 0.5% by weight of impurities, and 0.3 part by weight of a dispersing agent (glycerin monostearate) were kneaded at 150° C. for 8 minutes by Brabender Plastograph and formed into a film of 100μ thick by pressing at 170° C. The film was transparent and superior in the retention of infrared radiation as shown in Table 1.

EXAMPLE 6

Operation was carried out in the same manner as in Example 1 except that titanium silicate gel [refractive index ($n_B$), 1.502; content of adsorbed water at 25° C. and at 65% RH, 28%; average particle size, 4μ] comprising 13.7% by weight of $TiO_2$, 82.5% by weight of $SiO_2$ and 3.8% by weight of ignition loss was used in place of the aluminum silicate gel. The properties of a film thus obtained were measured in the same manner. The results are shown in Table 1.

EXAMPLE 7

Operation was carried out in the same manner as in Example 1 except that calcium silicate gel [refractive index ($n_B$), 1.501; content of adsorbed water at 25° C. and at 65% RH, 26%; average particle size, 3.7μ] was used in place of the aluminum silicate gel. The properties of a film thus obtained were measured in the same manner. The results are shown in Table 1.

EXAMPLE 8

Operation was carried out in the same manner as in Example 1 except that magnesium silicate gel [refractive index ($n_B$), 1.500; content of adsorbed water at 25° C. and 65% RH, 29%; average particle size, 4μ] was used in place of the aluminum silicate gel. The properties of a film thus obtained were measured in the same manner. The results are shown in Table 1.

COMPARATIVE EXAMPLES 1 to 3

The same operations as in Examples 1 to 3 were carried out except that the aluminum silicate gel was not used in each case. The properties of a film thus obtained were measured in the same manner. The results are shown in Table 1.

COMPARATIVE EXAMPLE 4

Operation was carried out in the same manner as in Example 1 except that silica gel [refractive index ($n_B$), 1.465; content of adsorbed water at 25° C. and at 65% RH, 29%; average particle size, 4μ] was used in place of the aluminum silica gel. The properties of a film thus obtained were measured in the same manner. The results are shown in Table 1.

COMPARATIVE EXAMPLE 5

Operation was carried out in the same manner as in Example 1 except that anhydrous kaolinite [composition, $Al_2O_3.2SiO_2.2H_2O$; refractive index, 1.560; content of adsorbed water at 25° C. and at 65% RH, 3.0%; average particle size, 4μ] was used in place of the aluminum silicate gel. The properties of a film thus obtained were measured in the same manner. The results are shown in Table 1.

EXAMPLE 9

One hundred parts of an ethylene/vinyl acetate copolymer [melt index, 2 g/10 min.; refractive index ($n_A$), 1.498] containing 15% by weight of vinyl acetate, 8 parts by weight of aluminum silica gel [refractive index ($n_B$), 1.493; content of adsorbed water at 25° C. and at 65% RH, 21%; average particle size, 4μ; composition, $(SiO_2)_x \cdot (Al_2O_3)_y \cdot nH_2O$ provided that y/x was 0.23] previously dried at 150° C. for 2 hours comprising 26% by weight of $Al_2O_3$, 67% by weight of $SiO_2$ and 7% by weight of ignition loss, and 0.3 part by weight of a dispersing agent (glycerin monostearate) were kneaded at 130° C. to 150° C. for 10 minutes by a 5-liter Banbury mixer and formed into pellets by an extruder. The resulting mixture is referred to as filler-mixed resin hereinafter.

Three-layer transparent film of sandwich structure was prepared using a multi-laminated film extruder equipped with a dies (caliber, 150 mm φ) for three-layer film. To the middle channel of the dies (temperature, 190° C.) was supplied the filler-mixed resin through a 40 mm φ extruder (fusion zone, 180° C.) at a rate of 9 kg/hr., and to the outer and inner channels of the dies (temperature, 190° C.) was supplied Hi-milan® 1650 (Zn ion type ethylene/methacrylic acid copolymer produced by Mitsui Polychemical Co.; density, 0.95; melt index, 1.5) through an extruder (fusion zone, 215° C.) at a rate of 4.2 kg/hr. The resins supplied to the three channels were laminated, in said dies, into a tubular film having a three-layer sandwich structure. The tubular film was taken off under the condition wherein a blow-up ratio be 2.4 a frost line distance be 200 mm. and a take-off speed be 4.9 m/min. Thus, three-layer transparent film of sandwich structure (lay-flat width, 365 mm.; thickness, 0.013 mm. for inner layer, 0.05 mm. for interlayer and 0.013 mm. for outer layer) was obtained.

The film thus obtained was measured for retention of infrared radiation, total transmittance, transmittance of parallel light, haze, tear strength, punching impact strength and rubbing resistance. The results are shown in Table 2.

Further, the film was measured for an effect to prevent water droplet adhesion, and it was found that the effect was good even after 3 months.

EXAMPLE 10

Operation was carried out in the same manner as in Example 9 except that, in place of Hi-milan®1650, Hi-milan® 1707 (density, 0.95 g/cm³; melt index, 0.9 g/10 min., a Na ion type ethylene/methacrylic acid copolymer) was supplied to the inner and outer channels of the dies (temperature, 195° C.) through an extruder (fusion zone, 220° C.). Thus, a transparent film was obtained. The physical properties of the film are shown in Table 2.

EXAMPLE 11

Operation was carried out in the same manner as in Example 9 except that, in place of Hi-milan® 1650, Sumikathene® F 208-1 (high-pressure process low-density polyethylene produced by Sumitomo Chemical Co.; density, 0.925 g/cm³; melt index, 1.7 g/10 min.) was supplied to the inner and outer channels of the dies (temperature, 168° C.) through an extruder (fusion zone, 173° C.). Thus, a transparent film was obtained. The physical properties of the film are collectively shown in Table 2.

EXAMPLE 12

Operation was carried out in the same manner as in Example 9 except that, in place of Hi-milan® 1650, an ethylene/4-methyl-1-pentene copolymer (density, 0.920 g/cm³; melt index, 2 g/10 min.; content of 4-methyl-1-pentene, 9% by weight) obtained with a Ziegler catalyst was supplied to the inner and outer channels of the dies (temperature, 168° C.) through an extruder (fusion zone, 175° C.). Thus, a transparent film was obtained. The physical properties of the film are shown in Table 2.

EXAMPLE 13

Operation was carried out in the same manner as in Example 9 except that, in place of Hi-milan® 1650, an ethylene/butene copolymer (density, 0.920 g/cm³; melt index, 1.5 g/10 min.; content of butene-1, 10% by weight) was supplied to the inner and outer channels of the dies (temperature, 168° C.) through an extruder (fusion zone, 175° C.). Thus, a transparent film was obtained. The physical properties of the film are shown in Table 2.

EXAMPLE 14

Operation was carried out in the same manner as in Example 9 except that, in place of Hi-milan® 1650, an ethylene/vinyl acetate copolymer (density, 0.94 g/cm³; melt index, 0.6 g/10 min.; content of vinyl acetate, 15% by weight) was supplied to the inner and outer channels of the dies (temperature, 168° C.) through an extruder (fusion zone, 175° C.). Thus, a transparent film was obtained. THe physical properties of the film are shown in Table 2.

EXAMPLE 15

Operation was carried out in the same manner as in Example 9 except that, in place of Hi-milan ® 1650, an ethylene/acrylic acid copolymer (melt index, 10 g/10 min.; content of acrylic acid, 20% by weight) was supplied to the inner and outer channels of the dies (temperature, 168° C.) through an extruder (fusion zone, 170° C.). Thus, a transparent film was obtained. The physical properties of the film are shown in Table 2.

EXAMPLE 16

Operation was carried out in the same manner as in Example 9 except that, in place of aluminum silicate gel in the filler-mixed resin supplied to the middle channel, the same amount of aluminum silicate [refractive index $(n_B)$, 1.494; content of adsorbed water at 25° C. and at 65% RH, 3%; average particle size, 4μ] comprising 27.5% by weight of $Al_2O_3$, 72% by weight of $SiO_2$ and 0.5% by weight of impurities was used. Thus, a transparent film was obtained. The physical properties of the film are shown in Table 2.

The effect of this film to prevent water droplet adhesion was measured, and it was found that the effect after 3 months was slightly inferior to that of the film obtained in Example 9, showing local deposit of a group of water droplets.

EXAMPLE 17

Operation was carried out in the same manner as in Example 9 except that, in place of aluminum silicate gel in the filler-mixed resin supplied to the middle channel, the same amount of titanium silicate gel [refractive index $(n_B)$, 1.502; content of adsorbed water at 25°0 C. and at 65% RH, 28%; average particle size, 4μ] comprising 13.7% by weight of $TiO_2$, 82.5% by weight of $SiO_2$ and 3.8% by weight of ignition loss was used. Thus, a transparent film was obtained. The physical properties of the film are shown in Table 2.

EXAMPLE 18

Operation was carried out in the same manner as in Example 9 except that, in place of the ethylene/vinyl acetate copolymer, a base resin, in the filler-mixed resin supplied to the middle channel, Sumikathene ® F208-1 [high-pressure process polyethylene; density, 0.925 g/cm³; melt index, 1.7 g/10 min; refractive index $(n_A)$, 1.501] was used, and that, in place of Hi-milan ® 1650, the same Sumikathene ® F208-1 was supplied to the inner and outer channels of the dies (temperature, 168° C.) through an extruder (fusion temperature, 173° C.). Thus, a transparent film was obtained. The physical properties of the film are shown in Table 2.

COMPARATIVE EXAMPLE 6

Only the ethylene/vinyl acetate copolymer, a base resin, in the filler-mixed resin used as interlayer in Example 9 was formed into a mono-layer film of tubular form using a 50 mm φ extruder equipped with a sprial dies (caliber, 100 mm.) while keeping the fusion zone at 180° C. and the dies at 177° C. The mono-layer film was taken off under the condition wherein a blow-up ratio be 2.4, a front line distance be 200 mm. and a take-off speed be 5 m/min. The physical properties of the film are shown in Table 2.

COMPARATIVE EXAMPLE 7

A filler-mixed resin pellet was produced in the same manner as in Example 9 except that the amount of aluminum silicate gel in the filler-mixed resin used as interlayer was changed to 5.4 parts by weight. This pellet was formed into a mono-layer film using the same extruder and extruding condition as in Comparative Example 6. The film thus obtained was slightly poor in the impression of transparency. The physical properties of the film are shown in Table 2.

COMPARATIVE EXAMPLE 8

Operation was carried out in the same manner as in Example 9 except that, in place of aluminum silicate gel in the filler-mixed resin used as interlayer, the same amount of silica gel [refractive index $(n_B)$, 0.465; content of adsorbed water at 25° C. and at 65% RH, 29%; average particle size, 4μ] was used. The film obtained was opaque. The physical properties of the film are shown in Table 2.

COMPARATIVE EXAMPLE 9

Operation was carried out in the same manner as in Example 11 except that, in place of polyethylene used as inner and outer layers, a high-pressure process polyethylene (density, 0.922 g/cm³; melt index, 7 g/10 min.) was used. Thus, a transparent film was obtained. The physical properties of the film are shown in Table 2.

COMPARATIVE EXAMPLE 10

Operation was carried out in the same manner as in Example 14 except that, in place of the ethylene/vinyl acetate copolymer used as inner and outer layers, an ethylene/vinyl acetate copolymer (density, 0.94 g/cm³; melt index, 3 g/10 min.) containing 17% by weight of vinyl acetate was used. Thus, a transparent film was obtained. The physical properties of the film are shown in Table 2.

COMPARATIVE EXAMPLE 11

The physical properties of a commercial polyvinyl chloride film for agriculture (thickness, 0.075 mm.) containing about 40% of a plasticizer consisting mainly of di-2-ethylhexyl phthalate were measured in the same manner as above. The results are shown in Table 2.

TABLE 1

|  | Refractive index of resin $(n_A)$ | Refractive index of resin $(n_B)$ | Ratio of refractive index $(n_A/n_B)$ | Retention of infrared radiation ΔT (°C.) | Total transmittance (%) | Transmittance of parallel light (%) | Haze (%) | Prevention of water droplet deposit Months elapsed | | | | |
|---|---|---|---|---|---|---|---|---|---|---|---|---|
|  |  |  |  |  |  |  |  | 1 | 2 | 3 | 4 | 6 |
| Example 1 | 1.498 | 1.493 | 1.003 | −0.4 | 91.2 | 87.4 | 3.8 | o | o | o | o | o |
| Example 2 | 1.489 | 1.493 | 0.997 | −0.3 | 92.4 | 88.7 | 3.7 | — | — | — | — | — |
| Example 3 | 1.515 | 1.493 | 1.015 | −0.8 | 89.6 | 81.3 | 8.3 | — | — | — | — | — |
| Example 4 | 1.498 | 1.493 | 1.003 | 0 | 91.0 | 87.1 | 3.9 | — | — | — | — | — |
| Example 5 | 1.498 | 1.494 | 1.003 | −0.9 | 91.5 | 87.9 | 3.6 | o | Δ | Δ | x | x |
| Example 6 | 1.498 | 1.502 | 0.997 | −0.5 | 91.2 | 87.4 | 3.8 | o | o | o | o | o |

TABLE 1-continued

| | Refractive index of resin ($n_A$) | Refractive index of resin ($n_B$) | Ratio of refractive index ($n_A/n_B$) | Retention of infrared radiation $\Delta T$ (°C.) | Total transmittance (%) | Transmittance of parallel light (%) | Haze (%) | Prevention of water droplet deposit Months elapsed | | | | |
|---|---|---|---|---|---|---|---|---|---|---|---|---|
| | | | | | | | | 1 | 2 | 3 | 4 | 6 |
| Example 7 | 1.498 | 1.501 | 0.998 | −0.5 | 91.2 | 87.6 | 3.6 | — | — | — | — | — |
| Example 8 | 1.498 | 1.500 | 0.999 | −0.5 | 91.4 | 87.7 | 3.7 | — | — | — | — | — |
| Comparative Example 1 | 1.498 | — | — | −1.6 | 91.5 | 88.5 | 3.0 | o | Δ | Δ | x | x |
| Comparative Example 2 | 1.489 | — | — | −1.5 | 92.7 | 89.9 | 2.8 | — | — | — | — | — |
| Comparative Example 3 | 1.515 | — | — | −2.4 | 90.0 | 82.9 | 7.1 | — | — | — | — | — |
| Comparative Example 4 | 1.498 | 1.465 | 1.023 | −0.4 | 91.0 | 51.0 | 40.0 | — | — | — | — | — |
| Comparative Example 5 | 1.498 | 1.560 | 0.960 | −1.2 | 90.6 | 51.6 | 39.0 | — | — | — | — | — |

TABLE 2

| | Composition of film | | | | Physical property of film | | | | | |
|---|---|---|---|---|---|---|---|---|---|---|
| | | | | | Optical property | | | Retention of infrared radiation T (°C.) | Rubbing resistance | |
| | Interlayer (0.05 mm.) | | | Outer layer (0.013 mm.) resin | Total transmittance (%) | Transmittance of parallel light (%) | Haze (%) | | Weight degrement by rubbing (mg/hr) | Time required for film breakdown (min.) |
| | Base resin | Filler | Amount (PHR) | | | | | | | |
| Example 9 | EVA | Aluminum silicate gel | 8 | Hi-milan 1650 | 91.0 | 83.5 | 7.5 | −0.4 | 0.5 | 220 |
| Example 10 | " | Aluminum silicate gel | " | Hi-milan 1707 | 91.1 | 86.0 | 5.1 | −0.4 | 0.4 | 240 |
| Example 11 | " | Aluminum silicate gel | " | LDPE | 90.7 | 85.7 | 5.0 | −0.5 | 0.6 | 180 |
| Example 12 | " | Aluminum silicate gel | " | EMP | 91.0 | 83.2 | 7.8 | −0.5 | 0.7 | 170 |
| Example 13 | " | Aluminum silicate gel | " | EB | 91.1 | 83.2 | 7.9 | −0.5 | 0.6 | 190 |
| Example 14 | " | Aluminum silicate gel | " | EVA | 91.1 | 86.3 | 4.8 | −0.4 | 2.3 | 120 |
| Example 15 | " | Aluminum silicate gel | " | EAA | 90.8 | 85.9 | 4.9 | −0.3 | 0.7 | 180 |
| Example 16 | " | Aluminum silicate gel | " | Hi-milan 1650 | 90.8 | 83.0 | 7.8 | −0.6 | 0.5 | 220 |
| Example 17 | " | Titanium silicate gel | " | " | 91.0 | 84.2 | 6.8 | −0.5 | 0.5 | 220 |
| Example 18 | LDPE | Aluminum silicate gel | " | LDPE | 91.0 | 85.7 | 5.3 | −0.9 | 0.6 | 180 |
| Comparative Example 6 | | EVA mono-layer film | | | 91.7 | 89.2 | 2.5 | −1.6 | Immeasurable; breakdown after 40 minutes | 40 |
| Comparative Example 7 | EVA | Aluminum silicate gel | 5.4 | — | 90.5 | 72.5 | 18.0 | −0.4 | Same as above | 35 |
| Comparative Example 8 | EVA | Silica gel | 8 | Hi-milan 1650 | 89.9 | 49.9 | 40.0 | −0.4 | 0.5 | 220 |
| Comparative Example 9 | EVA | Aluminum silicate gel | 8 | LDPE | 90.5 | 85.4 | 5.1 | −0.4 | 8.5 | 90 |
| Comparative Example 10 | EVA | Aluminum silicate gel | 8 | EVA | 91.1 | 86.2 | 4.9 | −0.4 | Immeasurable; breakdown after 25 minutes | 25 |
| Comparative | Agricultural polyvinyl chloride film | | | | 91.8 | 85.7 | 6.1 | −0.4 | 1.8 | 220 |

TABLE 2-continued

| | Composition of film | | | Physical property of film | | | | | |
|---|---|---|---|---|---|---|---|---|---|
| | | | | Optical property | | | Retention of infrared radiation T (°C.) | Rubbing resistance | |
| | Interlayer (0.05 mm.) | | Outer layer (0.013 mm.) resin | Total transmittance (%) | Transmittance of parallel light (%) | Haze (%) | | Weight degrement by rubbing (mg/hr) | Time required for film breakdown (min.) |
| Base resin | Filler | Amount (PHR) | | | | | | | |
| Example 11 | | | | | | | | | |

(Note)
EVA: Ethylene/vinyl acetate copolymer.
EB: Ethylene/butene-1 copolymer.
LDPE: High-pressure low density polyethylene.
EAA: Ethylene/acrylic acid copolymer.
EMP: Ethylene/4-methyl-1-pentene copolymer.
PHR: Part by weight per one hundred parts of base resin.

What is claimed is:

1. An agricultural plastic film laminate which comprises an olefin resin film produced by forming into a film a composition comprising 100 parts by weight of an olefin resin (A) and 2 to 25 parts by weight per 100 parts by weight of said olefin resin of an amorphous hydrated aluminum silicate gel represented by the formula:

$$(SiO_2)_x \cdot (Al_2O_3)_y \cdot nH_2O$$

wherein x and y are positive numbers such that $0.08 \leq y/x \leq 0.33$ and n is a positive number, said aluminum silicate containing not less than 10% of adsorbed water at 25° C. and at a relative humidity of 65%, the ratio of the refractive index ($n_A$) of said olefin resin to that ($n_B$) of said aluminum silicate gel, $n_A/n_B$, being within the range of 0.99 to 1.02, wherein said olefin film is laminated with laminating resin selected from ionomer resins (C) and olefin resins (D) on one or both sides of the film.

2. An agricultural plastic film according to claim 1, wherein said laminated film comprises an interlayer of the olefin resin film and outer layers of the film of the laminating resin.

3. An agricultural plastic film according to claim 1, wherein said olefin resin (A) is a low-density polyethylene or ethylene/α-olefin copolymer having a density of 0.910 to 0.935.

4. An agricultural plastic film according to claim 1, wherein said olefin resin (A) is an ethylene/vinyl acetate copolymer containing not more than 30% by weight of vinyl acetate.

5. An agricultural plastic film according to claim 1, wherein said ionomer resin (C) used as outer layers is an ethylene/methacryclic acid copolymer of zinc ion- or sodium ion-crosslinked structure having a density of 0.935 to 0.975 g/cm³ and a melt index of 0.5 to 7 g/10 min.

6. An agricultural plastic film according to claim 1, wherein said olefin resin (D) used as outer layers is a polyethylene or ethylene/α-olefin copolymer having a density of 0.915 to 0.935 g/cm³ and a melt index of 0.1 to 4 g/10 min.

7. An agricultural plastic film according to claim 1, wherein said olefin resin (D) used as outer layers is an ethylene/vinyl acetate copolymer having a melt index of 0.1 to 3 g/10 min., a vinyl acetate content of not more than 20% by weight.

* * * * *